(12) United States Patent
Tene et al.

(10) Patent No.: US 7,117,318 B1
(45) Date of Patent: Oct. 3, 2006

(54) MEMORY MANAGEMENT

(75) Inventors: Gil Tene, San Carlos, CA (US); Cliff N. Click, San Jose, CA (US); Michael A. Wolf, San Francisco, CA (US); Ivan Posva, Menlo Park, CA (US)

(73) Assignee: Azul Systems, Inc., Mountain View, CA (US)

( * ) Notice: Subject to any disclaimer, the term of this patent is extended or adjusted under 35 U.S.C. 154(b) by 455 days.

(21) Appl. No.: 10/701,388

(22) Filed: Nov. 4, 2003

Related U.S. Application Data

(60) Provisional application No. 60/492,585, filed on Aug. 4, 2003.

(51) Int. Cl.
*G06F 12/00* (2006.01)

(52) U.S. Cl. .............. 711/154; 711/100; 711/151; 711/158; 711/165; 711/170

(58) Field of Classification Search .......... 711/154, 711/100, 151, 158, 165, 170
See application file for complete search history.

(56) References Cited

U.S. PATENT DOCUMENTS

| | | | |
|---|---|---|---|
| 4,422,145 A * | 12/1983 | Sacco et al. ............... 711/160 |
| 5,485,613 A * | 1/1996 | Engelstad et al. .......... 707/206 |
| 5,491,808 A * | 2/1996 | Geist, Jr. .................... 711/100 |
| 5,893,121 A * | 4/1999 | Ebrahim et al. ............ 707/206 |
| 6,047,125 A * | 4/2000 | Agesen et al. .............. 717/148 |
| 6,192,517 B1 * | 2/2001 | Agesen et al. .............. 717/154 |
| 6,505,344 B1 * | 1/2003 | Blais et al. ................. 717/151 |

OTHER PUBLICATIONS

Hansen et al., "An Experimental Study of Renewal-Older-First Garbage Collection," ACM, pp. 247-258, Oct. 2002.*
Blackburn et al., "Beltway: Getting Around Garbage Collection Gridlock," ACM, pp. 153-164, Jun. 2002.*
Domani, Tamar, et al, "Thread-Local Heaps for Java", IBM Haifa Research Laboratory, ISMM '02, Jun. 20-21, 2002, Berlin Germany.

* cited by examiner

*Primary Examiner*—Stephen C. Elmore
(74) *Attorney, Agent, or Firm*—Van Pelt, Yi & James LLP

(57) ABSTRACT

A technique for managing an object in memory is disclosed. The technique comprises: assigning the object to an assigned frame wherein the object can be released when the assigned frame is released; detecting an attempt to place a reference to the object in an older frame, the older frame being older than the assigned frame; and reassigning the object to a reassignment frame that is at least as old as the older frame.

78 Claims, 9 Drawing Sheets

MEMORY MANAGEMENT

CROSS REFERENCE TO RELATED APPLICATIONS

This application claims priority to U.S. Provisional Patent Application No. 60/492,585 entitled "STACK BASED ALLOCATION" filed Aug. 4, 2003 which is incorporated herein by reference for all purposes.

FIELD OF THE INVENTION

The present invention relates generally to computer programming techniques. More specifically, a technique for memory management is disclosed.

BACKGROUND OF THE INVENTION

Efficient memory management is important for efficient execution of computer programs. Many programming languages support memory management for heap memory. For example, some virtual machine implementations use a fast generational garbage collector that allocates objects from the heap, wherein the allocation streams through memory. Typically, streamed data flushes lines out of the cache and forces extra read operations and write operations. This leads to extra memory traffic and inefficient utilization of caches.

One way of reducing memory traffic is to use stack based allocation for memory management. In systems that support stack based allocation schemes, objects are allocated on the running program's stack instead of a shared heap. The memory is freed when the stack frame exits. Since manual stack allocation requires extensive programmer intervention and is error prone, stack based allocation is typically done automatically. Currently, successful stack based allocation requires accurate knowledge about the lifetime of objects. Such knowledge may be acquired using escape analysis. However, escape analysis is typically an expensive operation performed at compile time, making it impractical for large-scale development efforts. Also, current escape analysis tends to be pessimistic, that is, it tends to limit stack based allocation to those objects that can be proven to be safe to allocate on the stack. Such pessimistic allocation potentially misses a significant number of effective stack based allocation opportunities.

It would be useful to have a memory management technique that would allow for efficient stack based allocation, without incurring the compile time overhead associated with escape analysis. It would also be desirable if the memory management technique could maximize the opportunities for stack based allocation.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

An improved technique for managing an object in memory is disclosed. In some embodiments, any attempt to place a reference to an object in an older frame is detected, and the object is reassigned to a reassignment frame that is at least as old as the older frame. In some embodiments, the reassignment frame is the older frame. In some embodiments, a frame identifier is associated with the object and used for detecting any attempt to place a reference to an object in an older frame.

For the purposes of illustration, the following objects and related functions are used as an example:

```
Sam {
a=new;
bad=Uli( );
Ted( );
. . . use bad . . . ;
}
Ted {
c=new;
return;
}
Uli {
d=new;
return d;
}
```

Figure 1A:
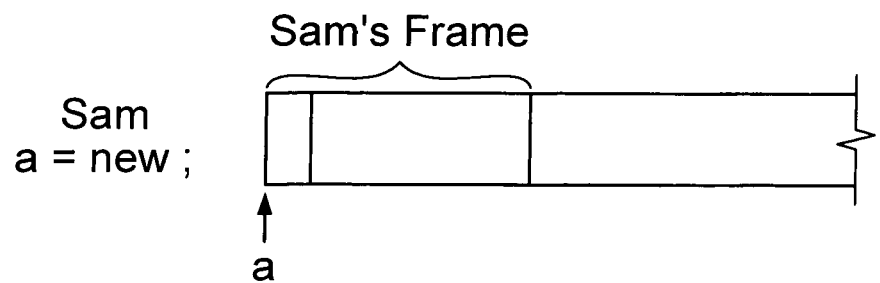
FIGS. 1A–1C are diagrams illustrating the stack in several stages.
Figure 1B:
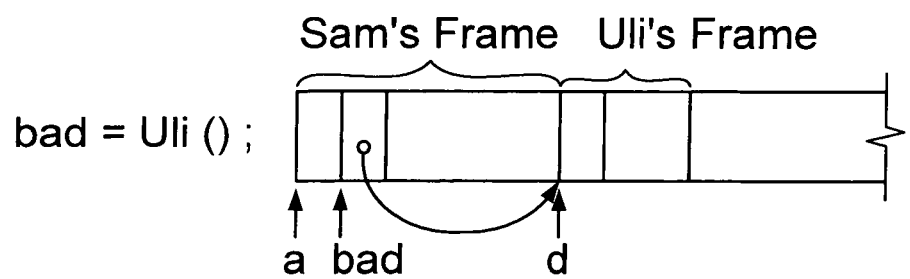
Figure 1C:
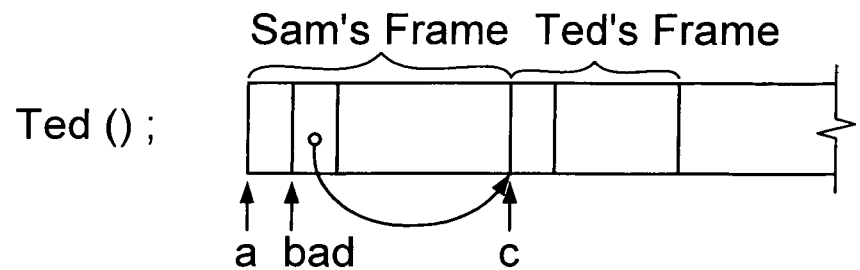

The objects are allocated on the stack in this example. FIGS. 1A–1C are diagrams illustrating the stack in several stages. FIG. 1A is a diagram illustrating the stack after Sam is invoked. A frame associated with Sam is allocated on the stack. The frame is a logical collection of memory used by the function Sam. Although the frame is shown as a contiguous block of memory in this example, it may sometimes be discontiguous and include several blocks.

FIG. 1B is a diagram illustrating the stack after bad=Uli( ) is invoked. A frame is allocated for Uli after Sam's frame. In this example, a frame that is allocated later on the stack is deemed to be a younger frame than any frame allocated before it on the stack since the previously allocated frame will outlast the later allocated frame in terms of function scope. Thus, Uli's frame is younger than Sam's frame since Uli's frame will go out of scope before Sam's frame does.

In Uli's frame, an object "d" is allocated at the beginning of Uli's frame. A pointer in Sam, "bad", points to "d". Assigning Uli to pointer "bad" has the effect of assigning object "d" of Uli to a pointer in Sam; this is referred to as an escape. An escape happens whenever an object allocated in a younger frame becomes visible to an older frame.

If not properly handled, escapes can lead to undesirable effects, as illustrated in FIG. 1C. FIG. 1C is a diagram illustrating the stack after Ted( ) is invoked. Since Sam's frame is an older frame that outlasts Uli's frame, once the call to Uli completes, Uli's frame is cleared from the stack. Ted's frame is then allocated on the stack at the beginning from the same location as where Uli's frame was. However, the pointer in Sam's frame, "bad", still points to the location where the "d" object in Uli's frame once occupied. The address occupied previously by the "d" object in Uli's frame is now occupied by the "c" object in Ted's frame, thus when bad is invoked, unpredictable behavior may occur.

Figure 2A:
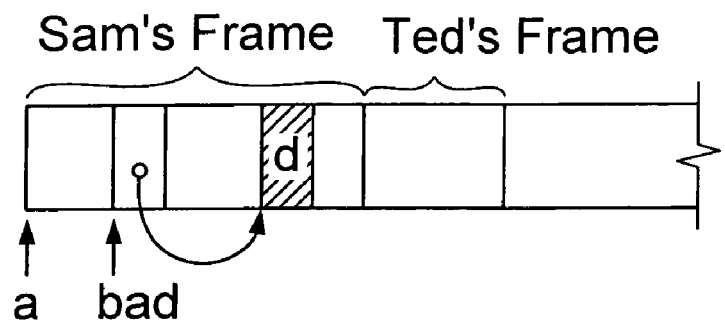
FIG. 2A is a diagram illustrating a stack that is modified according to one embodiment.

In some embodiments, escape detection is performed to prevent unpredictable behavior associated with escapes. Once an escape is detected, it may be handled by modifying the stack frames and objects to ensure proper program code behavior. FIG. 2A is a diagram illustrating a stack that is modified according to one embodiment. Returning to the previous example, when an escape of Uli's frame is detected (i.e., when bad=Uli( ) is invoked), Sam's frame is modified to store the object "d" directly. In this example, "d" is copied onto Sam's frame and the pointer "bad" now points to the address in Sam's frame that is now occupied by "d". When Uli's frame goes out of scope, the pointer to "d" is still valid since "d" has become a part of Sam's frame and shares the same scope as other objects in Sam's frame.

Figure 2B:
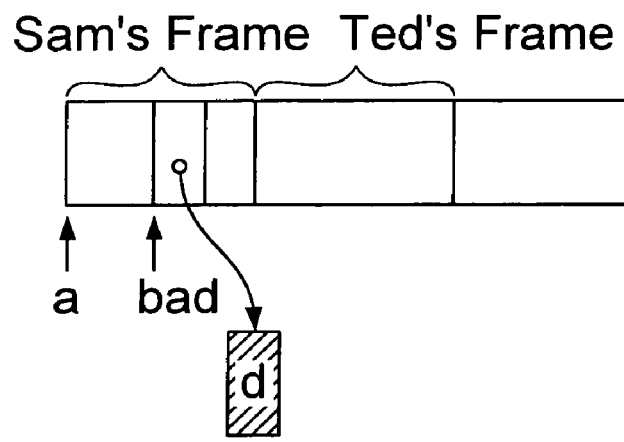
FIG. 2B is a diagram illustrating another example of a stack that is modified upon detecting an escape.

FIG. 2B is a diagram illustrating another example of a stack that is modified upon detecting an escape. In this example, the size of object "d" is determined to be greater than the amount of space available in Sam's frame for storing additional objects. Thus, an additional block of memory is allocated in an overflow area to store "d", and "bad" now references the newly allocated "d". Sam's frame is a logical frame that includes the memory originally allocated for the frame and any additional memory used to store modified objects. In some embodiments, references to "d" and references to younger objects by "d" are updated also. Details of the updates are discussed below.

Figure 3:
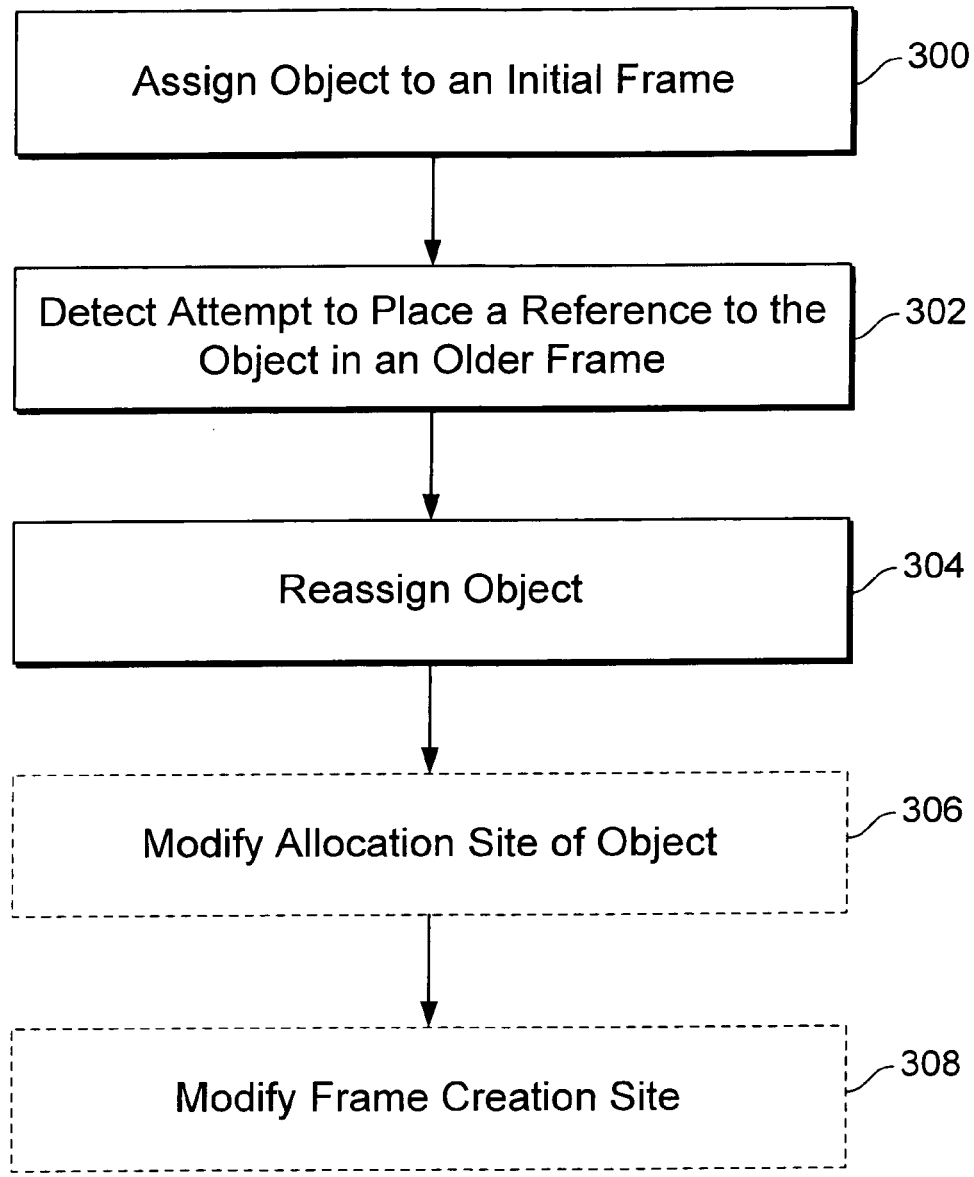
FIG. 3 is a flowchart illustrating a memory management technique using escape detection according to one embodiment.

FIG. 3 is a flowchart illustrating a memory management technique using escape detection according to one embodiment. When an object is created, it is assigned to an initial frame (300). Any attempt to place a reference to the object in an older frame is detected (302). The object is then reassigned to a reassignment frame that is at least as old as the older frame. In some embodiments, the reassignment frame is the older frame; in some embodiments, the reassignment frame is a frame older than the older frame.

In some embodiments, the system learns upon detecting an escape and uses the reassignment information to improve performance. For example, the system may learn that an escape occurs at a certain allocation site where the object is allocated. As used herein, an object's allocation site refers to the location in the program code that allocates the object. To reduce the cost of reassigning the object next time, program code at the allocation site of the object is modified so that the object is automatically reassigned next time it is allocated (306). In some embodiments, the same type of object may have multiple allocation sites that are distinguished according to their call paths. The call path information can be stored and code at each allocation site can be modified differently to handle escapes.

In some embodiments, the system learns when additional memory is required for the reassignment frame to store the reassigned object. The frame creation site (i.e. the location in the program code used to create frames) of the reassignment frame may be modified so that next time the frame is created, additional memory is automatically allocated for the frame to accommodate the reassigned object (308). In some embodiments, side tables or other appropriate data structures may also be used to assist escape handling and object creation. These learning features are optional and may be omitted.

Figure 4A:
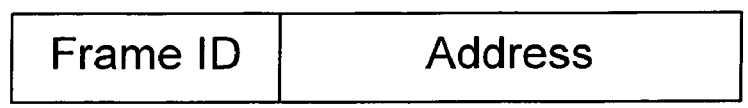
FIG. 4A is a diagram illustrating an address that incorporates a frame identifier according to one embodiment.

Frame identifiers (FIDs) are sometimes used in conjunction with references or address of the objects to facilitate escape detection. FIG. 4A is a diagram illustrating an address that incorporates a frame identifier according to one embodiment. In this example, several bits at the beginning of an address block are reserved to store the FID. The rest of the bits are used to store the actual address or reference to an object. The value of the FID is a function of the object's frame depth in some embodiments. For example, in an embodiment where the function is a count of the frame depth, a program with 5 nested calls results in a FID of 5 for the newest frame. Escape attempts, including any attempt to store an object allocated in a younger frame to another object allocated in an older frame as well as returning an object allocated in a younger frame to a method invoked from an older frame can be detected by comparing the FIDs.

Figure 4B:
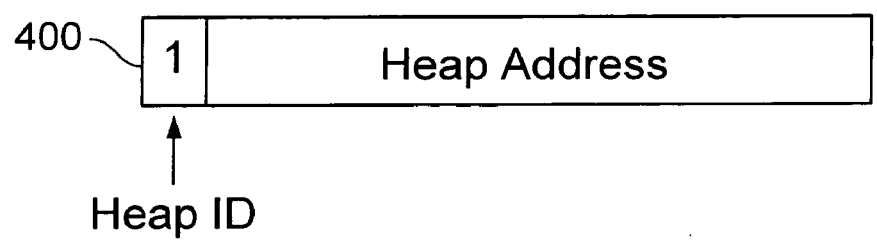
FIG. 4B is a diagram illustrating address structures used in another embodiment.
Figure 4B:
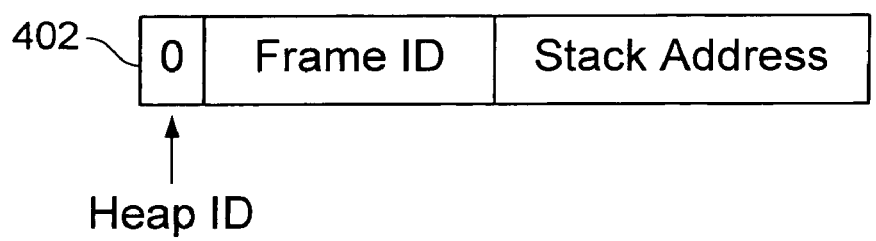

In some embodiments, heap memory is regarded as a regular frame and assigned a FID; in some embodiments, heap memory is treated specially. FIG. 4B is a diagram illustrating address structures used in another embodiment. In this example, a heap identifier is used to differentiate objects allocated on the heap from the object allocated on the stack. The heap identifier may be a distinguishing bit or a distinguishing set of bits. In this example, the heap identifier is a single reserved bit. An address for an object allocated on the heap such as 400 sets the heap identifier to 1 and the rest of the bits are used to store the address or reference to the heap memory. An address for an object stored on the stack such as 402 sets the heap identifier to zero indicating that a predetermined number of bits following the heap identifier are used as a FID and the rest of the bits are used to store the stack address or reference to the object. Using a heap identifier makes more bits available for storing the heap address.

Another way to detecting an escape is to directly compare the addresses of the objects. In some embodiments, the direction in which the stack grows determines how the comparison is to be performed. For example, if the stack grows up, an object with a higher address value is deemed to be younger than an object with a lower address value; if the stack grows down, the object with a higher address value is considered to be older than an object with a lower address value. Additional checking may be performed to detect the false positive created by objects that are allocated in the same frame, but in the reverse order. In some embodiments, a FID is stored just prior to the object with a negative offset in the stack or as part of the object's header word, and the additional test compares the FIDs to determine the relative age of objects.

Figure 5:
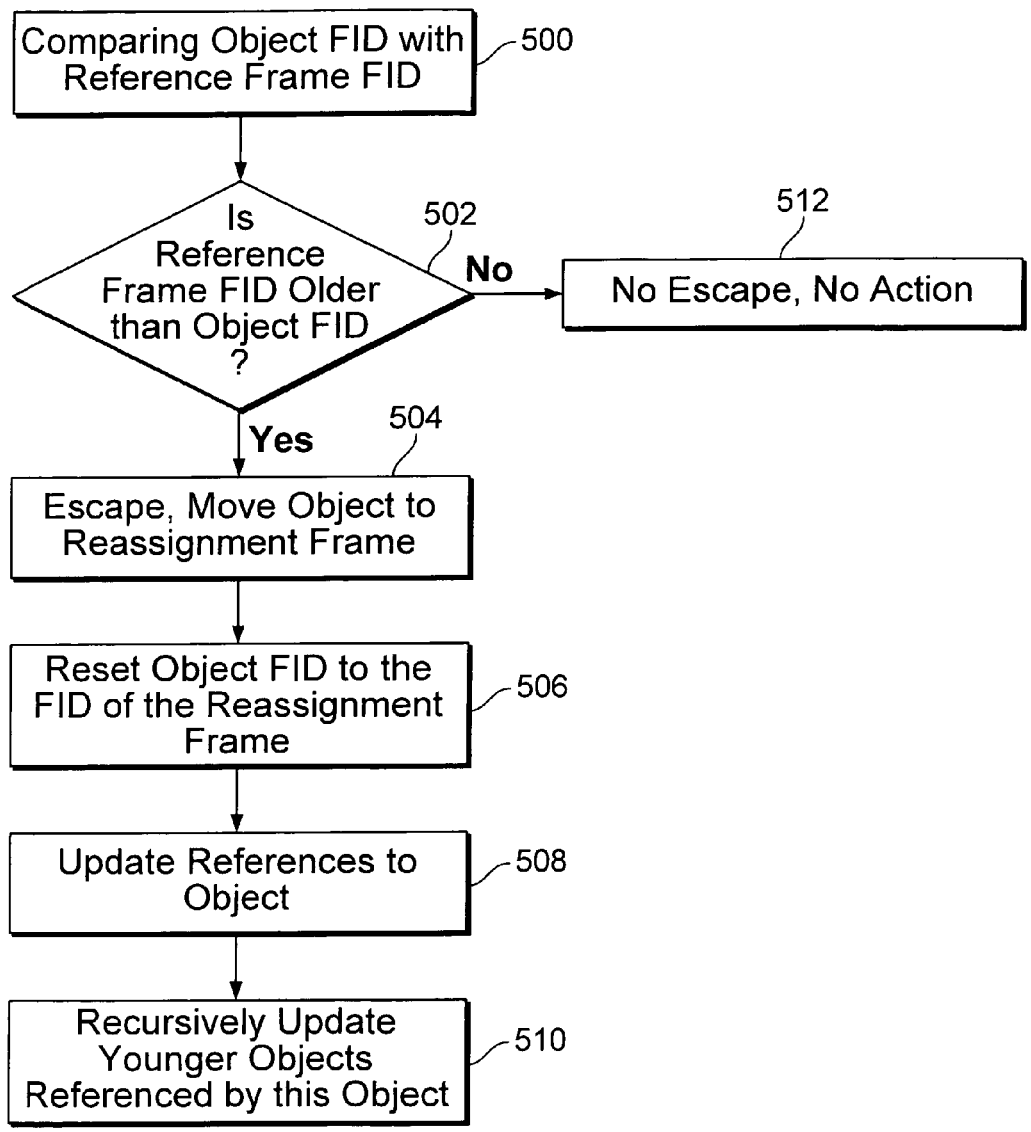
FIG. 5 is a flowchart illustrating escape detection and object reassignment according to one embodiment.

FIG. 5 is a flowchart illustrating escape detection and object reassignment according to one embodiment. In this example, the FID of the object is compared with the FID of the frame that references the object (500). It is determined whether the reference frame FID is older than the object FID (502). If the reference frame FID is not older, there is no escape and no action needs to be taken (512). If it is determined that the reference frame FID is older than the object FID, an escape has occurred and the object is moved to its reassignment frame, in this case the reference frame (504). The object FID is then reset to the FID of the reassignment frame (506). The references to the object are also updated (508). In this embodiment, since the object has not yet escaped, the references to be updated include the ones in the reassignment frame and any frames younger than the reassignment frame. Younger objects referenced by the reassigned object are then updated recursively (510).

In some embodiments, the escape detection is performed with assistance from hardware configured to make the detection more efficient. For example, hardware assist may be used to compare the FID's of the object and the reassignment frame, and generate a trap if an escape is detected. Such hardware can be specially designed and/or configured to efficiently perform operations such as FID comparison and increase system speed.

Figure 6:
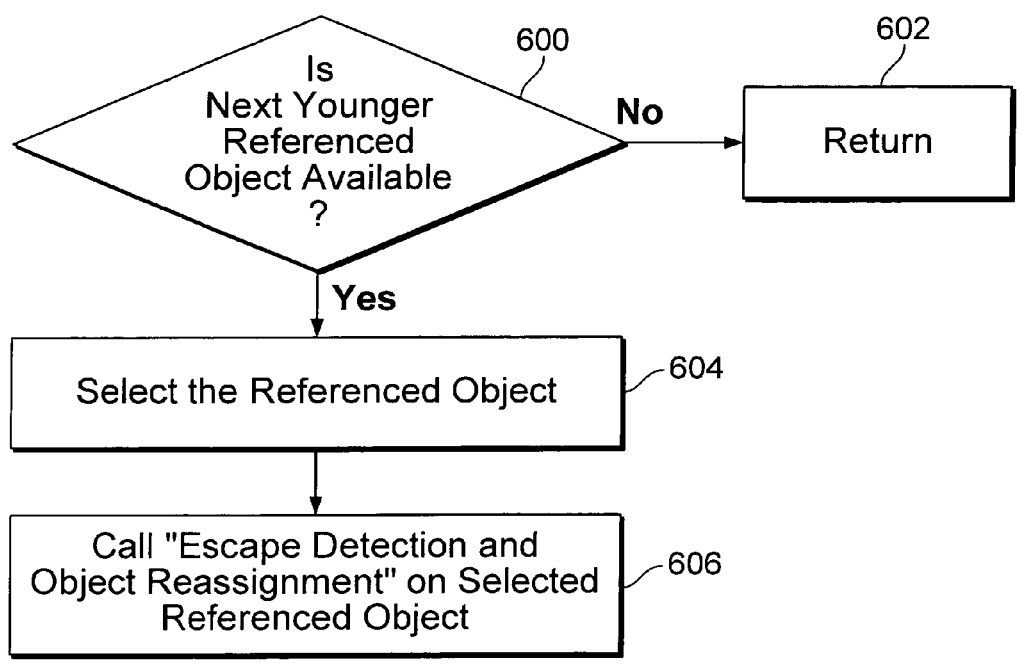
FIG. 6 is a flowchart illustrating the recursive update of younger objects according to one embodiment.

FIG. 6 is a flowchart illustrating the recursive update of younger objects according to one embodiment. In this example, it is determined if the next younger referenced object is available (600). If no more referenced object is available, the recursive call returns (602). If a younger object is available, it is selected (604). The escape detection and object reassignment process shown in FIG. 5 is then repeated for the selected referenced object and the recursion continues (606).

Figure 7:
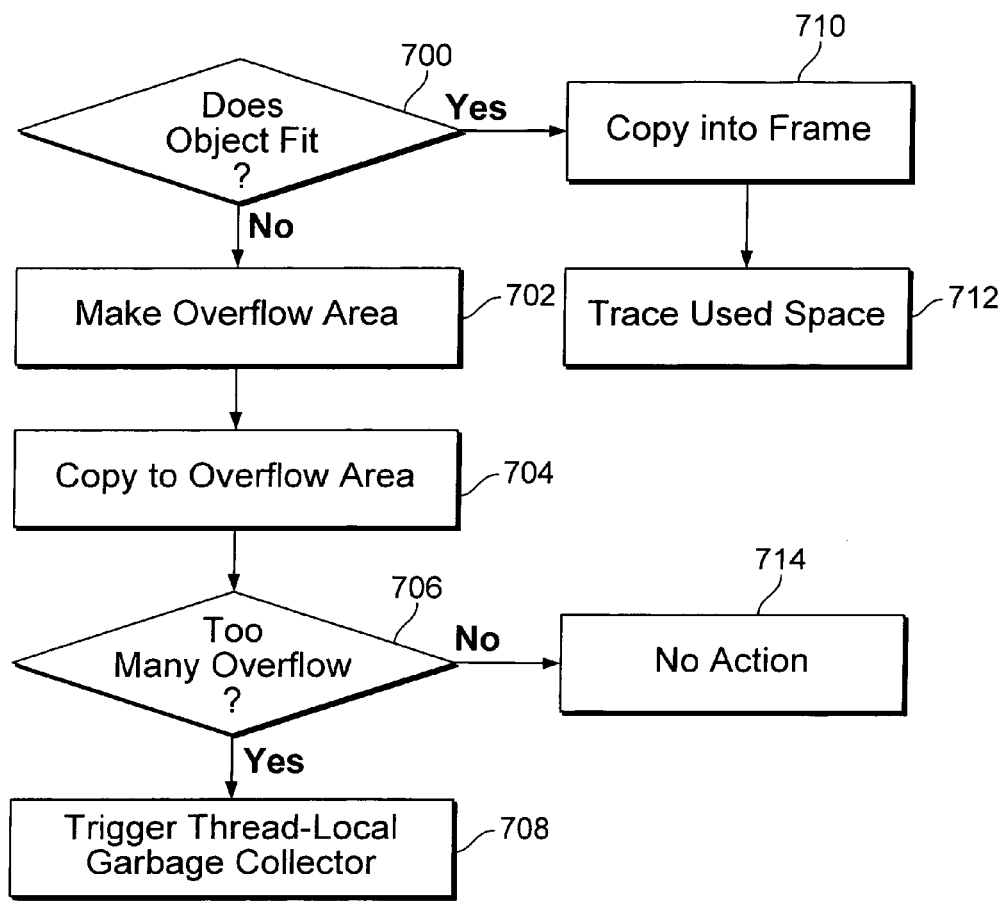
FIG. 7 is a flowchart illustrating how an object is moved to the reassignment frame according to one embodiment.

FIG. 7 is a flowchart illustrating how an object is moved to the reassignment frame according to one embodiment. It is determined whether the object fits in the reassignment frame (700). If the object fits in the reassignment frame, it is copied into the reassignment frame (710), and the used space is traced so that it will not be reassigned to other objects (712). If the object does not fit, an overflow area for the frame is created (702). The object is then copied to the overflow area (704). In this example, one overflow area per frame is created. If a frame stays in scope for an extended period of time, it may accumulate multiple objects in its overflow area. Objects that are no longer used should be removed. In some embodiments, it is determined whether the number of overflow objects has exceeded a certain threshold (706). If the overflow has not exceeded the threshold, there is still space available and no action needs to be taken (714). If, however, it is determined that there are too many overflow objects, the thread-local garbage collector then removes the dead objects from the overflow area (708). In some embodiments, instead of using an overflow area, the reassignment frame is expanded to accommodate the object.

Figure 8:
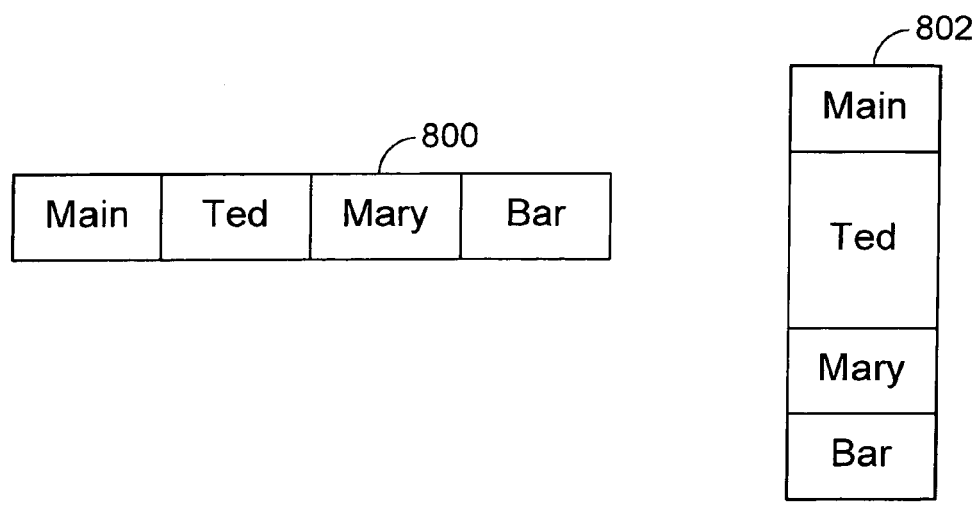
FIG. 8 is a diagram illustrating the use of a display according to one embodiment.

In some embodiments, a display is used to make the process of reassigning the object more efficient. FIG. 8 is a diagram illustrating the use of a display according to one embodiment. In the example shown, several objects, main, Ted, Mary and Bar are shown in different frames on stack 802. If, for example, Bar escapes to Ted's frame, determining where to copy Bar can incur significant operational overhead since the objects and the frames are of different sizes. In this embodiment, a display 800 is used to assist this process. Display 800 is an array that stores information about the frames and objects. In some embodiments, the array entries include the addresses for each of the frames. In some embodiments, the array entries include the addresses for the location in each object where an escaped object can be copied. Since the array element size is fixed, finding the location to copy the escaped object now involves going to a fixed offset in the display array to look up the address.

Figure 9:
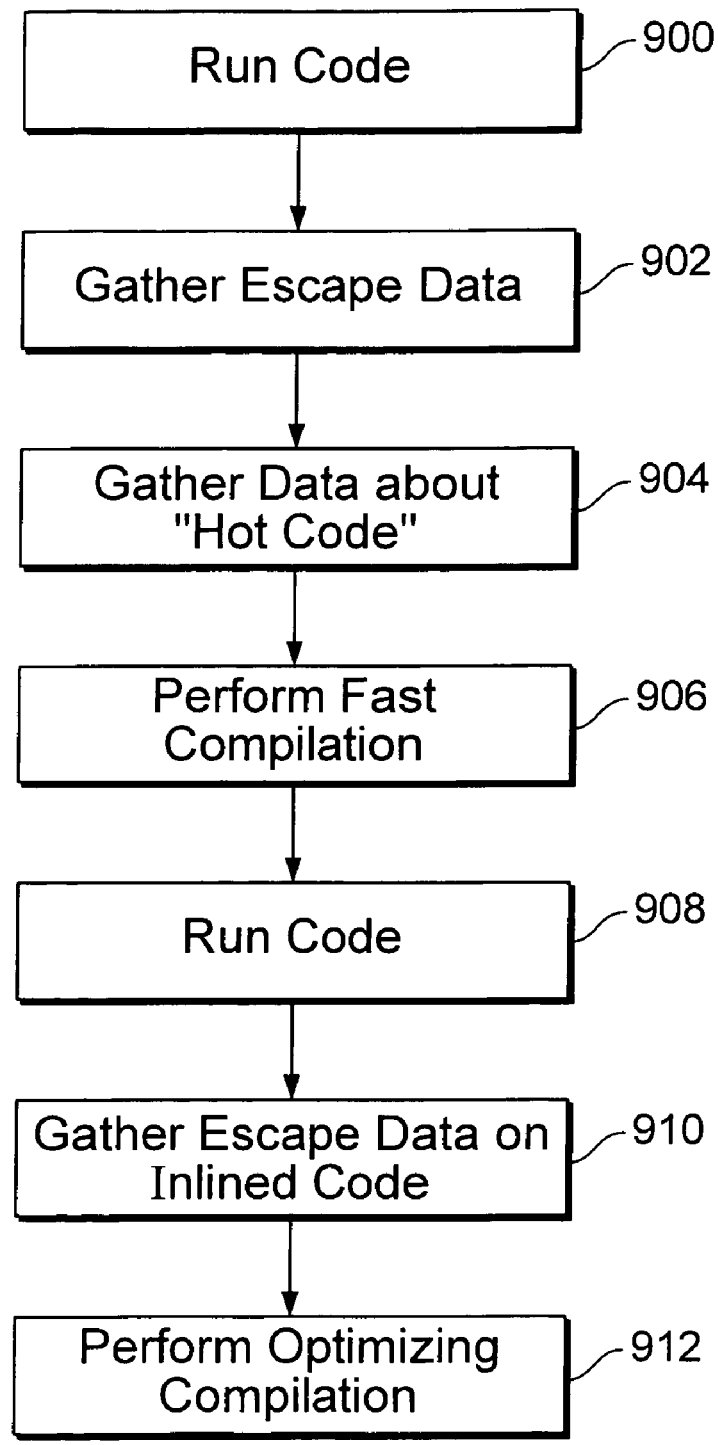
FIG. 9 is a flowchart illustrating an optimization process according to one embodiment.

In some embodiments, the program code may be optimized using escape information. FIG. 9 is a flowchart illustrating an optimization process according to one embodiment. In this example, the process begins with running code that has not been optimized, such as the interpreted code (900). Escape data is then gathered (902). In some embodiments, for each allocation site, the maximum number of frame levels any object created at the allocation site escapes (also referred to as the maximum escape depth) is recorded. This may be achieved by, for example, tagging each object with its allocation site information and associating an escape counter with each allocation site to store information about the maximum escape depth. When an object escapes, its allocation site is found and the escape counter associated with the allocation site is updated if the object's escape levels exceed the maximum escape depth currently stored in the escape counter of the allocation site.

Data regarding "hot code" is also gathered (904). A section of code is determined to be "hot" if it is frequently used. The criteria for determining which code section is hot may vary for different embodiments. For example, a counter may be used to determine how frequently a code path is exercised. A fast compilation is then performed to generate a version of compiled code that is optimized a bit more than the original interpreted version (906). In some embodiments, the compiler performs a small amount of inlining, including inlining hot code based on the information previously gathered. For example, if an object is included in a section of hot code, and if the escape depth of the object is below a certain threshold, then the call context of the object up to the escape depth may be inlined. In another example, if the escape data indicates that an object escapes all the way to the heap, then the compiler may choose not to inline calls to the object to save memory.

The code obtained from the fast compilation is then run (908), and the escape data on the inlined code is gathered (910). A slower optimizing compilation is then performed using the escape data gathered to provide a more optimized program (912). In some embodiments, the compiler provides deeper inlining for the hot code. Note that in order for the deeper inlining not to fail, objects called in the inlined code should not escape further than the context that is inlined. Although escape detection detects escapes that occur in the parts of the program code that have been exercised, it may not provide escape information for the rest of the code that has not been run. An allocation site may create objects that escape more levels than the current maximum escape depth, thus inlining the code that creates the object only up to the current maximum escape depth may result in failure. In some embodiments, a more accurate escape assessment is obtained by performing an escape analysis. The escape analysis, although expensive to run, can accurately determine whether objects created by each allocation site escapes further than the current prediction. In some embodiments, the compiler uses the results of the escape analysis to further optimize the code. For example, if the objects do not escape further than the current maximum escape depth, the code associated with the object can be safely inlined everywhere; if the object escapes further, deeper inlining may be performed.

In some embodiments, rather than using the same maximum escape depth to inline all instances of the same type of object to the same depth, multiple allocation sites for the object are tagged and different escape depths are used to more efficiently inline code that calls the object. In one example, an instance of a function named Bar is called by Sam and Bar creates objects that escape one frame level up to Sam. Another instance of the function Bar is called by Mary, which is in turn called by Ted, and here Bar creates objects that escape two frame levels up to Ted. Rather than inlining all calls to Bar at least two frame levels deep, the allocation site of Bar associated with Sam is inlined one frame level deep and the allocation site of Bar associated with Mary is inlined two frame levels deep into Ted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing an object in memory, comprising:
   assigning the object to an assigned frame wherein the object can be released when the assigned frame is released;
   detecting an attempt to place a reference to the object in an older frame, the older frame being older than the assigned frame; and
   reassigning the object to a reassignment frame that is at least as old as the older frame.

2. A method for managing an object in memory as recited in claim 1, wherein the reassignment frame is the older frame.

3. A method for managing an object in memory as recited in claim 1, wherein assigning the object to the assigned frame comprises associating a frame identifier with the object.

4. A method for managing an object in memory as recited in claim 1, wherein assigning the object to the assigned frame comprises associating a frame identifier with a reference of the object.

5. A method for managing an object in memory as recited in claim 1, wherein assigning the object to the assigned frame comprises associating a frame identifier with the object and detecting an attempt to place a reference to the object in an older frame is performed using the frame identifier.

6. A method for managing an object in memory as recited in claim 1, wherein detecting an attempt to place a reference to the object in an older frame comprises comparing a first frame identifier associated with the object with a second frame identifier associated with the older frame.

7. A method for managing an object in memory as recited in claim 1, wherein detecting an attempt to place a reference to the object in an older frame comprises comparing a first address associated with the object with a second address associated with the older frame.

8. A method for managing an object in memory as recited in claim 1, wherein detecting an attempt to place a reference to the object in an older frame comprises determining whether the object is in stack memory or heap memory.

9. A method for managing an object in memory as recited in claim 1, wherein detecting an attempt to place a reference to the object in an older frame comprises determining whether the object is in stack memory or heap memory by examining a distinguishing bit or a distinguishing set of bits.

10. A method for managing an object in memory as recited in claim 1, wherein detecting an attempt to place a reference to the object in an older frame comprises determining whether the object is in stack memory or heap memory; and heap memory is uniquely identified by a heap frame identifier.

11. A method for managing an object in memory as recited in claim 1, wherein reassigning the object to a reassignment frame that is at least as old as the older frame comprises recursively detecting whether the object references any younger object.

12. A method for managing an object in memory as recited in claim 1, wherein reassigning the object to a reassignment frame that is at least as old as the older frame comprises recursively detecting whether the object references any younger object and reassigning any referenced younger object to the reassignment frame.

13. A method for managing an object in memory as recited in claim 1, wherein reassigning the object to a reassignment frame comprises resetting a first frame identifier associated with the object to be the same as a second frame identifier associated with the reassignment frame.

14. A method for managing an object in memory as recited in claim 1, wherein reassigning the object to a reassignment frame comprises moving the object into the reassignment frame.

15. A method for managing an object in memory as recited in claim 1, wherein reassigning the object to a reassignment frame comprises moving the object into the reassignment frame and storing overflow in an overflow area associated with the reassignment frame.

16. A method for managing an object in memory as recited A claim 1, wherein reassigning the object to a reassignment frame comprises expanding the reassignment frame and moving the object into the reassignment frame.

17. A method for managing an object in memory as recited in claim 1, wherein reassigning the object to a reassignment frame comprises moving the object into the reassignment frame and updating a reference to the object.

18. A method for managing an object in memory as recited in claim 1, wherein reassigning the object to a reassignment frame comprises moving the object into the reassignment frame and updating all references to the object.

19. A method for managing an object in memory as recited in claim 1, wherein reassigning the object to a reassignment frame is assisted by a display.

20. A method for managing an object in memory as recited in claim 1, wherein reassigning the object includes tracing reassigned space.

21. A method for managing an object in memory as recited in claim 1, further comprises modifying an allocation site of the object.

22. A method for managing an object in memory as recited in claim 1, further comprises modifying a frame creation site.

23. A method for managing an object in memory as recited in claim 1, further comprises learning reassignment information.

24. A method for managing an object in memory as recited in claim 1, further comprising performing thread-local garbage collection.

25. A method for managing an object in memory as recited in claim 1, further comprising storing call path information associated with an allocation site of the object.

26. A method for managing an object in memory as recited in claim 1, wherein detecting an attempt to place a reference to the object in an older frame is performed with hardware assist.

27. A computer program product for managing an object in memory, the computer program product being embodied in a tangible computer readable medium and comprising computer instructions for:
   assigning the object to an assigned frame wherein the object can be released when the assigned frame is released;
   detecting an attempt to place a reference to the object in an older frame, the older frame being older than the assigned frame;
   reassigning the object to a reassignment frame that is at least as old as the older frame.

28. A computer program product for managing an object in memory as recited in claim 27, wherein the reassignment frame is the older frame.

29. A computer program product as recited in claim 27, wherein assigning the object to the assigned frame comprises associating a frame identifier with the object.

30. A computer program product as recited in claim 27, wherein assigning the object to the assigned frame comprises associating a frame identifier with a reference of the object.

31. A computer program product as recited in claim 27, wherein assigning the object to the assigned frame comprises associating a frame identifier with the object and detecting an attempt to place a reference to the object in an older frame is performed using the frame identifier.

32. A computer program product as recited in claim 27, wherein detecting an attempt to place a reference to the object in an older frame comprises comparing a first frame identifier associated with the object with a second frame identifier associated with the older frame.

33. A computer program product as recited in claim 27, wherein detecting an attempt to place a reference to the object in an older frame comprises comparing a first address associated with the object with a second address associated with the older frame.

34. A computer program product as recited in claim 27, wherein detecting an attempt to place a reference to the object in an older frame comprises determining whether the object is in stack memory or heap memory.

35. A computer program product as recited in claim 27, wherein detecting an attempt to place a reference to the object in an older frame comprises determining whether the object is in stack memory or heap memory by examining a distinguishing bit or a distinguishing set of bits.

36. A computer program product as recited in claim 27, wherein detecting an attempt to place a reference to the object in an older frame comprises determining whether the object is in stack memory or heap memory; and heap memory is uniquely identified by a heap frame identifier.

37. A computer program product as recited in claim 27, wherein reassigning the object to a reassignment frame that is at least as old as the older frame comprises recursively detecting whether the object references any younger object.

38. A computer program product as recited in claim 27, wherein reassigning the object to a reassignment frame that is at least as old as the older frame comprises recursively detecting whether the object references any younger object and reassigning any referenced younger object to the reassignment frame.

39. A computer program product as recited in claim 27, wherein reassigning the object to a reassignment frame comprises resetting a first frame identifier associated with the object to be the same as a second frame identifier associated with the reassignment frame.

40. A computer program product as recited in claim 27, wherein reassigning the object to a reassignment frame comprises moving the object into the reassignment frame.

41. A computer program product as recited in claim 27, wherein reassigning the object to a reassignment frame comprises moving the object into the reassignment frame and storing overflow in an overflow area associated with the reassignment frame.

42. A computer program product as recited in claim 27, wherein reassigning the object to a reassignment frame comprises expanding the reassignment frame and moving the object into the reassignment frame.

43. A computer program product as recited in claim 27, wherein reassigning the object to a reassignment frame comprises moving the object into the reassignment frame and updating a reference to the object.

44. A computer program product as recited in claim 27, wherein reassigning the object to a reassignment frame comprises moving the object into the reassignment frame and updating all references to the object.

45. A computer program product as recited in claim 27, wherein reassigning the object to a reassignment frame is assisted by a display.

46. A computer program product as recited in claim 27, wherein reassigning the object includes tracing reassigned space.

47. A computer program product as recited in claim 27, the computer program product further comprising instructions for modifying an allocation site of the object.

48. A computer program product as recited in claim 27, the computer program product further comprising instructions for modifying a frame creation site.

49. A computer program product as recited in claim 27, the computer program product further comprising instructions for learning reassignment information.

50. A computer program product as recited in claim 27, the computer program product further comprising instructions for performing thread-local garbage collection.

51. A computer program product as recited in claim 27, the computer program product further comprising instructions for storing call path information associated with an allocation site of the object.

52. A computer program product as recited in claim 27, wherein detecting an attempt to place a reference to the object in an older frame is performed with hardware assist.

53. A system for managing an object, comprising:
   a processor configured to:
   assign the object to an assigned frame wherein the object can be released when the assigned frame is released;
   detect an attempt to place a reference to the object in an older frame, the older frame being older than the assigned frame;
   reassign the object to a reassignment frame that is at least as old as the older frame; and
   a memory coupled to the processor, configured to provide the processor with instructions.

54. A system as recited in claim 53, wherein the reassignment frame is the older frame.

55. A system as recited in claim 53, wherein to assign the object to the assigned frame comprises to associate a frame identifier with the object.

56. A system as recited in claim 53, wherein to assign the object to the assigned frame comprises to associate a frame identifier with a reference of the object.

57. A system as recited in claim 53, wherein to assign the object to the assigned frame comprises to associate a frame identifier with the object and to detect an attempt to place a reference to the object in an older frame is performed using the frame identifier.

58. A system as recited in claim 53, wherein to detect an attempt to place a reference to the object in an older frame comprises to compare a first frame identifier associated with the object with a second frame identifier associated with the older frame.

59. A system as recited in claim 53, wherein to detect an attempt to place a reference to the object in an older frame comprises to compare a first address associated with the object with a second address associated with the older frame.

60. A system as recited in claim 53, wherein to detect an attempt to place a reference to the object in an older frame comprises to determine whether the object is in stack memory or heap memory.

61. A system as recited in claim 53, wherein to detect an attempt to place a reference to the object in an older frame comprises to determine whether the object is in stack memory or heap memory by examining a distinguishing bit or a distinguishing set of bits.

62. A system as recited in claim 53, wherein to detect an attempt to place a reference to the object in an older frame comprises to determine whether the object is in stack memory or heap memory; and heap memory is uniquely identified by a heap frame identifier.

63. A system as recited in claim 53, wherein to reassign the object to a reassignment frame that is at least as old as the older frame comprises to detect recursively whether the object references any younger object.

64. A system as recited in claim 53, wherein to reassign the object to a reassignment frame that is at least as old as the older frame comprises to detect recursively whether the object references any younger object and reassigning any referenced younger object to the reassignment frame.

65. A system as recited in claim 53, wherein to reassign the object to a reassignment frame comprises to reset a first frame identifier associated with the object to be the same as a second frame identifier associated with the reassignment frame.

66. A system as recited in claim 53, wherein to reassign the object to a reassignment frame comprises to move the object into the reassignment frame.

67. A system as recited in claim 53, wherein to reassign the object to a reassignment frame comprises to move the object into the reassignment frame and storing overflow in an overflow area associated with the reassignment frame.

68. A system as recited in claim 53, wherein to reassign the object to a reassignment frame comprises to expand the reassignment frame and to move the object into the reassignment frame.

69. A system as recited in claim 53, wherein to reassign the object to a reassignment frame comprises to move the object into the reassignment frame and to update a reference to the object.

70. A system as recited in claim 53, wherein to reassign the object to a reassignment frame comprises to move the object into the reassignment frame and to update all references to the object.

71. A system as recited in claim 53, wherein to reassign the object to a reassignment frame is assisted by a display.

72. A system as recited in claim 53, wherein to reassign the object includes to trace reassigned space.

73. A system as recited in claim 53, wherein the processor is further configured to modify an allocation site of the object.

74. A system as recited in claim 53, wherein the processor is further configured to modify a frame creation site.

75. A system as recited in claim 43, wherein the processor is further configured to learn reassignment information.

76. A system as recited in claim 53, wherein the processor is further configured to perform thread-local garbage collection.

77. A system as recited in claim 53, wherein the processor is further configured to store call path information associated with an allocation site of the object.

78. A system as recited in claim 53, wherein to detect an attempt to place a reference to the object in an older frame is performed with hardware assist.

* * * * *